(12) United States Patent
Tani et al.

(10) Patent No.: US 10,121,042 B2
(45) Date of Patent: Nov. 6, 2018

(54) FINGERPRINT DETECTION LIQUID

(71) Applicant: KINSEI MATEC CO., LTD., Osaka-shi, Osaka (JP)

(72) Inventors: Kokichi Tani, Osaka (JP); Junya Fujioka, Osaka (JP)

(73) Assignee: KINSEI MATEC CO., LTD., Osaka-Shi (JP)

( * ) Notice: Subject to any disclaimer, the term of this patent is extended or adjusted under 35 U.S.C. 154(b) by 170 days.

(21) Appl. No.: 15/416,193

(22) Filed: Jan. 26, 2017

(65) Prior Publication Data

US 2018/0039812 A1    Feb. 8, 2018

(30) Foreign Application Priority Data

Aug. 3, 2016 (JP) ................................. 2016-152572

(51) Int. Cl.
| | |
|---|---|
| *B01J 19/00* | (2006.01) |
| *G06K 9/00* | (2006.01) |
| *C08K 3/22* | (2006.01) |

(52) U.S. Cl.
CPC ............ *G06K 9/00006* (2013.01); *C08K 3/22* (2013.01); *C08K 2003/2241* (2013.01); *C08K 2003/2275* (2013.01)

(58) Field of Classification Search
CPC .................. G06K 9/00006; C08K 3/22; C08K 2003/2241; C08K 2003/2275
See application file for complete search history.

(56) References Cited

FOREIGN PATENT DOCUMENTS

| | | |
|---|---|---|
| JP | 2005-027986 | 2/2005 |
| JP | 2005027986 A * | 2/2005 |
| WO | 98/51219 | 11/1998 |

* cited by examiner

*Primary Examiner* — Dennis White
(74) *Attorney, Agent, or Firm* — Rankin, Hill & Clark LLP

(57) ABSTRACT

A fingerprint detection liquid that makes it possible to recover clear fingerprints from wet objects and various other objects without adjustment of concentration and composition. The fingerprint detection liquid includes not only pigment particles and a silicone but also a cationic surfactant and an ionizing liquid that ionizes the cationic surfactant. The cationic surfactant preferably includes octyldimethylethylammonium ethylsulfate.

7 Claims, 19 Drawing Sheets

FINGERPRINT DETECTION LIQUID

CROSS-REFERENCE TO RELATED APPLICATION

The present application claims priority to JP 2016-152572 filed Aug. 3, 2016, the disclosure of which is incorporated by reference herein in its entirety.

BACKGROUND OF THE INVENTION

(1) Field of the Invention

The present invention relates to a fingerprint detection liquid. Specifically, the present invention relates to a fingerprint detection liquid suitable for criminal investigation.

(2) Description of Related Art

Criminal investigation involves recovery of latent fingerprints on some objects. When digits of hand come into contact with objects, the secretions from the opening of the sweat glands present in epidermal ridges (hereinafter the secretions will be referred to as "fingerprint components") are deposited on some of the objects, so that fingerprints are left on some of the objects. In a common method for recovering such fingerprints, an officer applies a sticky fine powder to the secretions and then attaches the fine powder to a gelatin paper or the like. Visible fingerprints are obtained when the fine powder is attached to the gelatin paper or the like.

Examples of such a fine powder include an aluminum powder and carbon black. These fine powders have a problem in that the recovery of fingerprints from objects wet with water is difficult with them. If these fine powders are used to recover fingerprints from an object wet with water, waiting will be necessary until the object dries naturally, or it will be necessary to dry the object in some way. In addition, these fine powders also have a problem in that the recovery of fingerprints from kraft tapes is difficult with them.

International Publication No. 98/51219 discloses a fingerprint detection liquid that is obtained by diluting a pigment powder and a silicone compound with a polar solvent. The fingerprint detection liquid disclosed in International Publication No. 98/51219 makes it possible to recover fingerprints from objects wet with water.

Japanese Patent Application Laid-open No. 2005-27986 discloses a fingerprint detection liquid that is obtained by diluting a pigment powder and a surfactant with water. The fingerprint detection liquid disclosed in Japanese Patent Application Laid-open No. 2005-27986 makes it possible to recover fingerprints from objects wet with water.

PRIOR ART LITERATURE

Patent Literature 1: International Publication No. 98/51219

Patent Literature 2: Japanese Patent Application Laid-open No. 2005-27986

The fingerprint detection liquid disclosed in International Publication No. 98/51219 has a problem in that the recovery of fingerprints from kraft tapes is difficult with it. The fingerprint detection liquid disclosed in Japanese Patent Application Laid-open No. 2005-27986 has a problem in that its ability to recover fingerprints varies with the type of object from which fingerprints are recovered. The fingerprint detection liquid disclosed in Japanese Patent Application Laid-open No. 2005-27986 also has a problem in that at least one of the concentration and composition of it must be adjusted depending on the type of object from which fingerprints are recovered. This makes the procedure of recovering fingerprints complicated.

SUMMARY OF THE INVENTION

An object of the present invention is to provide a fingerprint detection liquid that makes it possible to recover clear fingerprints from wet objects and various other objects without adjustment of concentration and composition.

In order to solve the problems, a first aspect of the present invention provides a fingerprint detection liquid including pigment particles and a silicone. The fingerprint detection liquid according to the first aspect of the present invention further includes a cationic surfactant and an ionizing liquid. The ionizing liquid ionizes the cationic surfactant.

In a second aspect of the present invention, the fingerprint detection liquid according to the first aspect of the present invention further has the feature that the cationic surfactant includes the ionic crystal mentioned below. The ionic crystal has an ion represented by formula (1) below.

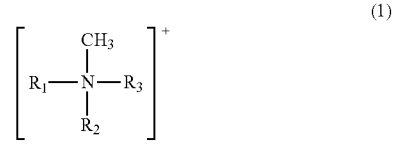

In the formula, $R_1$ and $R_2$ are each an alkyl group of 1 to 12 carbon atoms, and $R_3$ is a moiety including at least one selected from the group consisting of an aryl group and an alkyl group of 1 to 10 carbon atoms.

In a third aspect of the present invention, the fingerprint detection liquid according to the second aspect of the present invention further has the feature that the ionic crystal has the ion represented by formula (1) in which $R_3$ is an alkyl group of 1 to 10 carbon atoms.

In a fourth aspect of the present invention, the fingerprint detection liquid according to the second aspect of the present invention further has the feature that the ionic crystal having the ion represented by formula (1) is octyldimethylethylammonium ethylsulfate.

In a fifth aspect of the present invention, the fingerprint detection liquid according to the first aspect of the present invention further has the feature that the ionizing liquid includes water.

In a sixth aspect of the present invention, the fingerprint detection liquid according to the first aspect of the present invention further has the feature that the silicone is a polyether-modified silicone represented by formula (2) below.

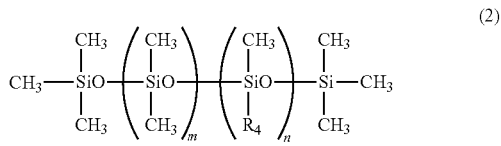

In the formula, $R_4$ is a polyoxyalkylene group represented by formula (3): $—R_5—O—(C_2H_4O)_a(C_3H_6O)_bR_6$, wherein $R_5$ is an alkylene group of 2 to 30 carbon atoms, $R_6$ is a substituent represented by formula (4): —(OC)—$R_7$, wherein $R_7$ is an alkyl group of 1 to 30 carbon atoms, a satisfies 1≤a≤50, b satisfies 1≤b≤50, a and b satisfy 10≤a+b≤100, and m and n satisfy 100≤m≤500 and 1≤n≤40, respectively.

In a seventh aspect of the present invention, the fingerprint detection liquid according to the first aspect of the present invention further has the feature that the pigment particles include at least one selected from the group consisting of titanium oxide, aluminum oxide, zinc oxide, zirconium oxide, red iron oxide, yellow oxide of iron, black oxide of iron, silica, carbon black, aluminum powder, and copper powder, or any composite thereof.

The fingerprint detection liquid of the present invention makes it possible to recover clear fingerprints from wet objects and various other objects without adjustment of concentration and composition.

DETAILED DESCRIPTION OF PREFERRED EMBODIMENTS

Components of Fingerprint Detection Powder

Figure 1:
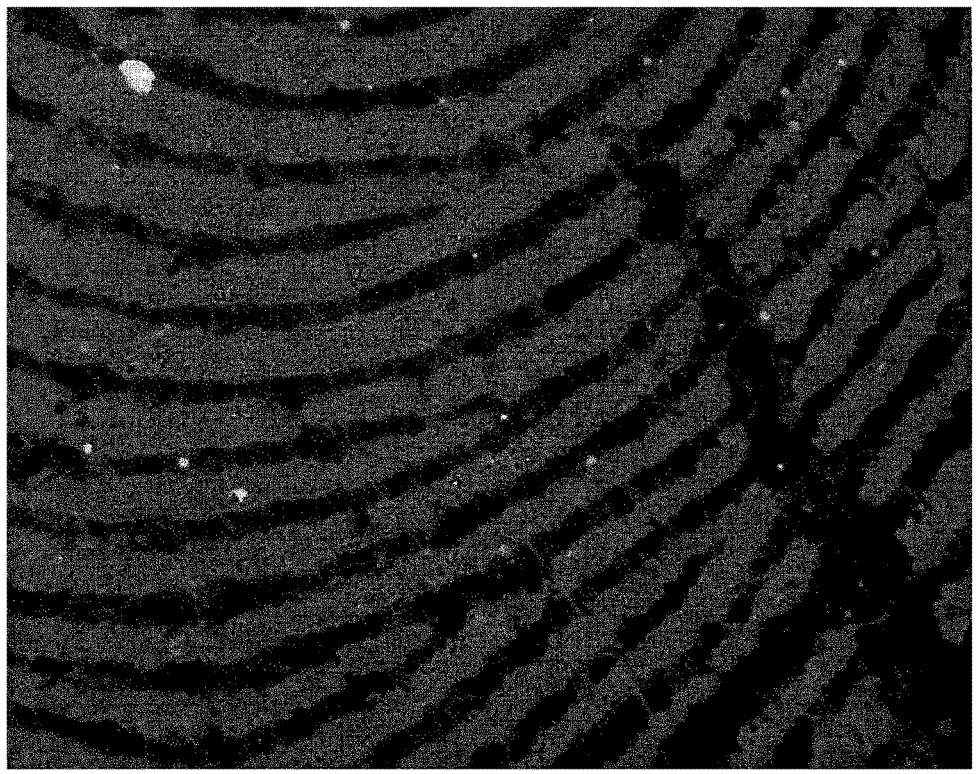
FIG. 1 is a photograph of a fingerprint obtained as a result of spraying a fingerprint detection liquid of Example 1 on a sample (made of acrylic) with a latent fingerprint and then washing the sample with water.

The fingerprint detection liquid according to the present invention includes an ionizing liquid and a cationic surfactant in addition to pigment particles (which means particles including a material well known as a pigment) and a silicone.

The presence of not only the silicone but also the cationic surfactant can increase the compatibility between the pigment particles and fingerprint components. This can suppress the adhesion of the pigment particles to substances other than fingerprint components. Fingerprint images can be made more clearly visible when the cationic surfactant is used in combination with the silicone than when they are used alone.

In the fingerprint detection liquid according to the present invention, the cationic surfactant may be of any type. In the present invention, the cationic surfactant preferably includes the ionic crystal described below. The ionic crystal includes an ion represented by formula (1) below.

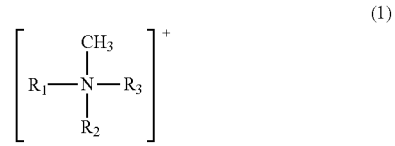

(1)

In the formula, $R_1$ and $R_2$ are each an alkyl group of 1 to 12 carbon atoms, and $R_3$ is a moiety including at least one selected from the group consisting of an aryl group and an alkyl group of 1 to 10 carbon atoms.

Examples of the ionic crystal including the ion represented by formula (1) include tributylbenzylammonium chloride and lauryldimethylbenzylammonium chloride. In the present invention, the cationic surfactant preferably incudes lauryldimethylbenzylammonium chloride as an ionic crystal. Lauryldimethylbenzylammonium chloride has a chemical structure represented by formula (3) below.

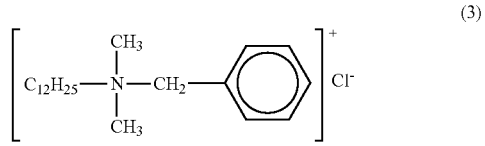

(3)

The ionic crystal described above preferably has the ion described below, which is represented by formula (1) in which $R_3$ is an alkyl group of 1 to 10 carbon atoms.

Examples of the ionic crystal including the ion represented by formula (1) in which $R_3$ is an alkyl group of 1 to 10 carbon atoms include lauryltrimethylammonium chloride, cetyltrimethylammonium chloride, stearyltrimethylammonium chloride, octyldimethylethylammonium ethyl sulfate, lauryldimethylethylammonium ethyl sulfate, palmityldimethylethylammonium ethyl sulfate, didecyldimethylammonium chloride, and octyldimethylethylammonium ethylsulfate. In the present invention, the cationic surfactant preferably includes, as an ionic crystal, at least one of didecyldimethylammonium chloride and octyldimethylethylammonium ethyl sulfate. Didecyldimethylammonium chloride has a chemical structure represented by formula (4) below.

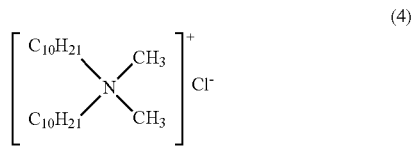

(4)

Octyldimethylethylammonium ethylsulfate has a chemical structure represented by formula (5) below.

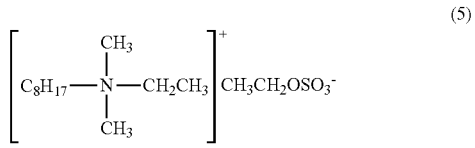

(5)

The fingerprint detection liquid according to the present invention may contain any weight percent (% by weight) of the cationic surfactant. Preferably, the fingerprint detection liquid contains 0.01% by weight to 10.00% by weight of the cationic surfactant.

In the present invention, the silicone may have any chemical structure. Examples of the silicone that may be contained in the fingerprint detection liquid according to the present invention include dimethyl silicone, dimethylpolysiloxane, dimethiconol, and phenyl trimethicone. Preferably, the fingerprint detection liquid according to the present invention contains, as the silicone, a polyether-modified silicone represented by formula (2) below. An example of the polyether-modified silicone may be a polyoxyethylene-polyoxypropylene-modified silicone.

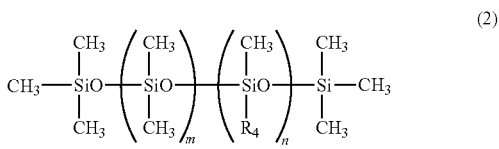

(2)

In the formula, $R_4$ is a polyoxyalkylene group represented by formula (3): $-R_5-O-(C_2H_4O)_a(C_3H_6O)_bR_6$, wherein $R_5$ is an alkylene group of 2 to 30 carbon atoms, $R_6$ is a substituent represented by formula (4): $-(OC)-R_7$, wherein $R_7$ is an alkyl group of 1 to 30 carbon atoms, a satisfies $1 \leq a \leq 50$, b satisfies $1 \leq b \leq 50$, a and b satisfy $10 \leq a+b \leq 100$, and m and n satisfy $100 \leq m \leq 500$ and $1 \leq n \leq 40$, respectively.

The fingerprint detection liquid according to the present invention may contain any weight percent (% by weight) of the silicone. However, when the fingerprint detection liquid according to the present invention contains the polyether-modified silicone represented by formula (2), the content of the polyether-modified silicone should preferably be from 0.10% by weight to 40.00% by weight.

In the fingerprint detection liquid according to the present invention, the silicone may be contained in any form. For example, the silicone may be dispersed in the liquid. Alternatively, the silicone may be contained as a component of a coating formed on the surface of the pigment particles (in the description of the present invention, the coating is referred to as the "surface layer"). Alternatively, the silicone may be a component of the pigment particles.

When the silicone is contained in the surface layer of the pigment particles, the surface layer may have any thickness. The specific form of the surface layer may also be of any type.

In the fingerprint detection powder according to the present invention, the specific component of the pigment particles may be of any type. Examples of materials that may constitute the pigment particles and are well known as pigments include titanium oxide, aluminum oxide, zinc oxide, zirconium oxide, red iron oxide, yellow oxide of iron, black oxide of iron, silica, carbon black, aluminum powder, and copper powder. Among them, titanium oxide and iron oxide are preferred as components of the pigment particles. In the present invention, the pigment particles may also be a composite of two or more of these materials.

Method for Producing Fingerprint Detection Powder

The fingerprint detection powder according to the present invention may be produced by any appropriate method. For example, the fingerprint detection powder according the present invention may be produced by a method that includes forming pigment particles by a well-known method, then allowing the silicone to adhere to the surface of the pigment particles by a well-known method, and mixing them with water and the surfactant. Alternatively, the fingerprint detection powder according to the present invention may also be produced by a method that includes forming silicone-containing pigment particles by a well-known method and then mixing the resulting pigment particles with water and the surfactant. Alternatively, the fingerprint detection powder according to the present invention may also be produced by a method that includes forming pigment particles by a well-known method and then mixing the pigment particles with the polyether-modified silicone, water, and the surfactant.

Method for Using Fingerprint Detection Powder

The fingerprint recovery solution according to the present invention may be used in any appropriate way. For example, the following method may be performed. By spraying or immersion, the fingerprint recovery solution according to the present invention is brought into contact with objects from which fingerprints are to be recovered. Subsequently, the excess of the pigment particles is removed from the objects by washing with water. The spraying or immersion may be performed by any method. For example, the fingerprint recovery solution according to the present invention may be sprayed using an atomizer or a spray pump. Putting water on the appearing fingerprints can be enough for the washing with water.

EXAMPLES

Hereinafter, Examples 1 and 2 according to an embodiment of the present invention will be described together with Comparative Examples 1 to 7.

Example 1

The operator thoroughly mixed 10 g of titanium oxide (CR-EL manufactured by ISHIHARA SANGYO KAISHA, LTD.) and 0.1 g of polyoxyethylene-polyoxypropylene-modified silicone (SH3749 manufactured by Dow Corning Toray Co., Ltd.). Subsequently, the operator added 100 g of ion-exchanged water and 0.1 g of octyldimethylethylammonium ethylsulfate to the mixture and stirred them. The mixture obtained by the stirring is the fingerprint detection liquid of this example.

Example 2

The operator thoroughly mixed 5 g of iron oxide (triiron tetraoxide, Cica first grade, manufactured by KANTO CHEMICAL CO., INC.) and 0.1 g of polyoxyethylene-polyoxypropylene-modified silicone (SH3749 manufactured by Dow Corning Toray Co., Ltd.). Subsequently, the operator added 100 g of ion-exchanged water and 0.1 g of octyldimethylethylammonium ethylsulfate to the mixture and stirred them. The mixture obtained by the stirring is the fingerprint detection liquid of this example.

Comparative Example 1

The operator mixed 10 g of a commercially available fingerprint detection powder (Super White, Kagakusobi Kenkyusho, Ltd.) and 100 g of ion-exchanged water. The resulting mixture is the fingerprint detection liquid of this comparative example.

Comparative Example 2

The operator mixed and stirred 1 g of aminopropyl dimethicone, 1 g of dimethyl silicone, 20 g of isopropyl alcohol, 0.1 g of acetic acid, and 77.9 g of ion-exchanged water. The operator added 10 g of titanium oxide to 100 g of the mixed aqueous solution obtained by the mixing and stirring. The resulting mixed aqueous solution is the fingerprint detection liquid of this comparative example.

Comparative Example 3

The operator mixed 3 g of triiron tetraoxide, 0.3 g of polyoxyethylene lauryl ether (EMULGEN 130K manufactured by Kao Corporation), and 100 g of ion-exchanged water. The resulting mixture is the fingerprint detection liquid of this comparative example.

Comparative Example 4

The operator mixed and stirred 10 g of titanium oxide, 100 g of ion-exchanged water, and 0.1 g of octyldimethylethylammonium ethylsulfate. The mixture obtained by the stirring is the fingerprint detection liquid of this comparative example.

Comparative Example 5

The operator mixed 10 g of titanium oxide and 0.1 g of polyoxyethylene-polyoxypropylene-modified silicone (SH3749 manufactured by Dow Corning Toray Co., Ltd.). Subsequently, the operator added 100 g of ion-exchanged water to the mixture. The resulting mixture containing 100 g of ion-exchanged water is the fingerprint detection liquid of this comparative example.

Comparative Example 6

The operator mixed 10 g of titanium oxide and 0.1 g of polyoxyethylene-polyoxypropylene-modified silicone (SH3749 manufactured by Dow Corning Toray Co., Ltd.). Subsequently, the operator added 100 g of ion-exchanged water and 0.1 g of sodium linear alkylbenzene sulfonate to the mixture and stirred them. The mixture obtained by the stirring is the fingerprint detection liquid of this comparative example.

Comparative Example 7

The operator mixed 10 g of titanium oxide and 0.1 g of polyoxyethylene-polyoxypropylene-modified silicone (SH3749 manufactured by Dow Corning Toray Co., Ltd.). Subsequently, the operator added 100 g of ion-exchanged water and 0.1 g of polyoxyethylene sorbitan monooleate to the mixture and stirred them. The mixture obtained by the stirring is the fingerprint detection liquid of this comparative example.

Determination of the Effect on Wet Samples

The operator followed the procedure described below to determine whether it was possible to recover fingerprints from wet objects. First, the operator prepared samples. The samples were plates or sheets made of the following materials: acrylic, aluminum, glass, a tile, a kraft tape with a non-sticky surface, a kraft tape with a sticky surface, a curing tape with a non-sticky surface, a curing tape with a sticky surface, a vinyl tape with a non-sticky surface, and a vinyl tape with a sticky surface. Nine samples were prepared for each material. Subsequently, the operator touched the finger to all the samples. In this step, fingerprint components were deposited on the samples. Subsequently, the operator sprayed water on all the samples. In this step, a state was produced in which each sample was wet with water. Subsequently, the operator sprayed the fingerprint detection liquids on the samples. The operator sprayed each of the fingerprint detection liquids of Examples 1 and 2 and Comparative Examples 1 to 7. After spraying each fingerprint detection liquid, the operator washed each sample with water. The fingerprint appeared on the surface of each sample after the washing with water. When the fingerprint appeared, the operator observed and evaluated the clarity of the fingerprint. Table 1 shows the results of the evaluation.

TABLE 1

| | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Acrylic plate | ⊙ | ⊙ | ○ | Δ | ○ | ○ | ○ | ○ | ○ |
| Aluminum plate | * | ⊙ | * | * | X | * | * | * | Δ |
| Glass plate | ⊙ | ⊙ | Δ | Δ | ○ | ○ | ○ | ○ | ○ |
| Tile | ⊙ | ⊙ | Δ | ○ | Δ | Δ | Δ | X | X |
| Kraft tape (non-sticky surface) | * | ⊙ | * | X | Δ | X | * | Δ | X |
| Kraft tape (sticky surface) | * | ⊙ | * | X | ○ | X | * | * | X |
| Curing tape (non-sticky surface) | ⊙ | ⊙ | ⊙ | ⊙ | Δ | Δ | Δ | Δ | Δ |
| Curing tape (sticky surface) | ○ | ○ | ○ | X | ○ | Δ | X | X | ○ |
| Vinyl tape (non-sticky surface) | ⊙ | ⊙ | Δ | X | ○ | Δ | Δ | Δ | X |
| Vinyl tape (sticky surface) | ⊙ | ○ | ○ | X | ○ | ○ | X | X | ○ |

The double circle in Table 1 means that adhesion of pigment particles does not occur between fingerprint ridge lines and the fingerprint lines are strong. The single circle in Table 1 means that adhesion of pigment particles does not occur between fingerprint ridge lines but the fingerprint lines are faint. The triangle mark in Table 1 means that adhesion of pigment particles occurs between fingerprint ridge lines. The x mark in Table 1 means that fingerprint ridge lines are almost invisible. The asterisk in Table 1 means that the fingerprint is invisible because it is colored the same as the sample material itself.

Figure 2:
FIG. 2 is a photograph of a fingerprint obtained as a result of spraying a fingerprint detection liquid of Example 1 on a sample (made of glass) with a latent fingerprint and then washing the sample with water.
Figure 3:
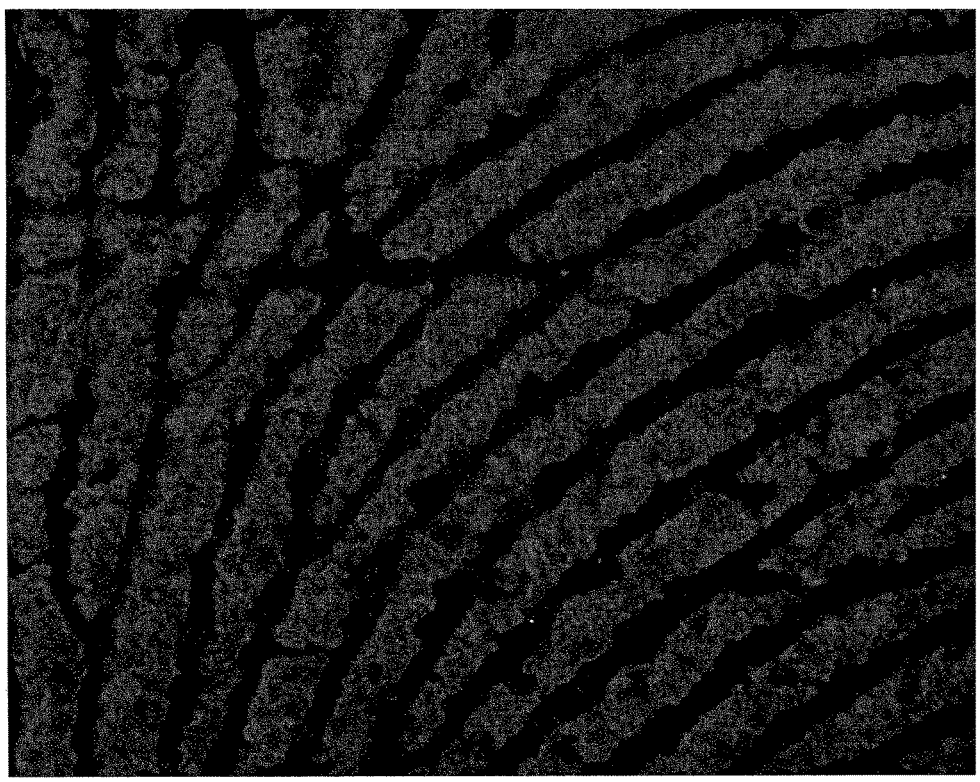
FIG. 3 is a photograph of a fingerprint obtained as a result of spraying a fingerprint detection liquid of Example 1 on a sample (made of a tile) with a latent fingerprint and then washing the sample with water.
Figure 4:
FIG. 4 is a photograph of a fingerprint obtained as a result of spraying a fingerprint detection liquid of Example 2 on a sample (made of acrylic) with a latent fingerprint and then washing the sample with water.
Figure 5:
FIG. 5 is a photograph of a fingerprint obtained as a result of spraying a fingerprint detection liquid of Example 2 on a sample (made of glass) with a latent fingerprint and then washing the sample with water.
Figure 6:
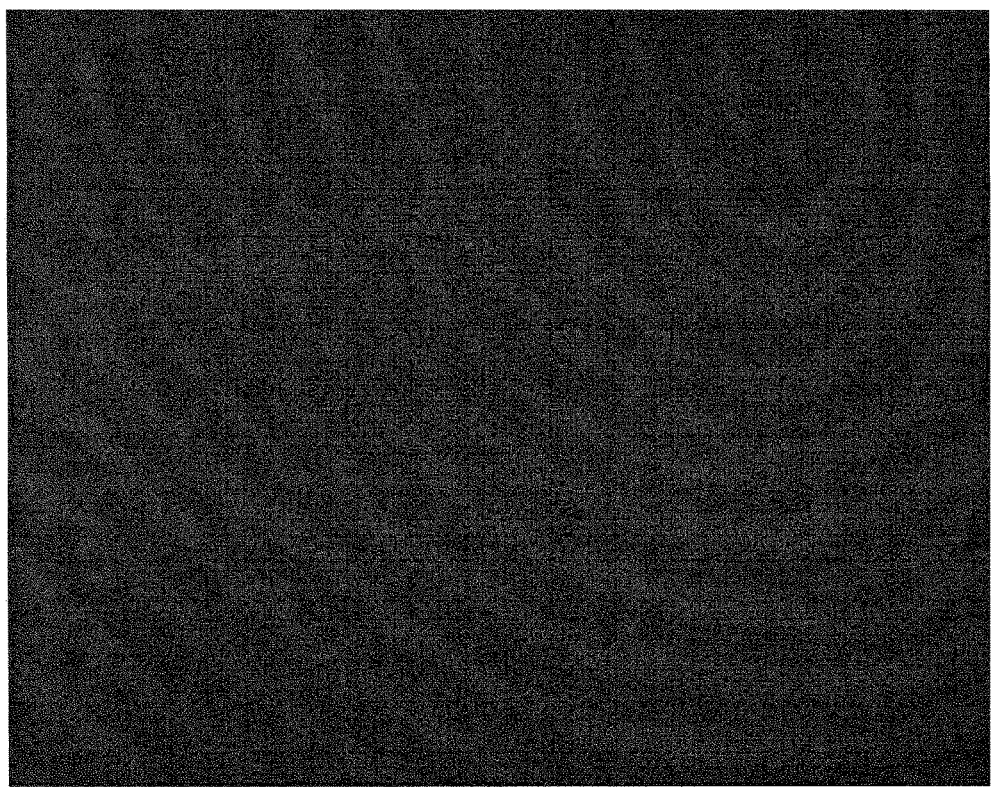
FIG. 6 is a photograph of a fingerprint obtained as a result of spraying a fingerprint detection liquid of Example 2 on a sample (made of a tile) with a latent fingerprint and then washing the sample with water.
Figure 7:
FIG. 7 is a photograph of a fingerprint obtained as a result of spraying a fingerprint detection liquid of Example 2 on a sample (made of a kraft tape with a non-sticky surface) with a latent fingerprint and then washing the sample with water.
Figure 8:
FIG. 8 is a photograph of a fingerprint obtained as a result of spraying a fingerprint detection liquid of Example 2 on a sample (made of a kraft tape with a sticky surface) with a latent fingerprint and then washing the sample with water.

FIG. 1 is a photograph of the fingerprint obtained as a result of spraying the fingerprint detection liquid of Example 1 on a sample (made of acrylic) with the latent fingerprint and then washing the sample with water. FIG. 2 is a photograph of the fingerprint obtained as a result of spraying the fingerprint detection liquid of Example 1 on a sample (made of glass) with the latent fingerprint and then washing the sample with water. FIG. 3 is a photograph of the fingerprint obtained as a result of spraying the fingerprint detection liquid of Example 1 on a sample (made of a tile) with the latent fingerprint and then washing the sample with water. FIG. 4 is a photograph of the fingerprint obtained as a result of spraying the fingerprint detection liquid of Example 2 on a sample (made of acrylic) with the latent fingerprint and then washing the sample with water. FIG. 5 is a photograph of the fingerprint obtained as a result of spraying the fingerprint detection liquid of Example 2 on a sample (made of glass) with the latent fingerprint and then washing the sample with water. FIG. 6 is a photograph of the fingerprint obtained as a result of spraying the fingerprint detection liquid of Example 2 on a sample (made of a tile) with the latent fingerprint and then washing the sample with water. FIG. 7 is a photograph of the fingerprint obtained as a result of spraying the fingerprint detection liquid of Example 2 on a sample (made of a kraft tape with a non-sticky surface) with the latent fingerprint and then washing the sample with water. FIG. 8 is a photograph of the fingerprint obtained as a result of spraying the fingerprint detection liquid of Example 2 on a sample (made of a kraft tape with a sticky surface) with the latent fingerprint and then washing the sample with water. FIGS. 1 to 8 show that a clear fingerprint is obtained using the fingerprint detection liquid of Example 1 or 2.

Figure 9:
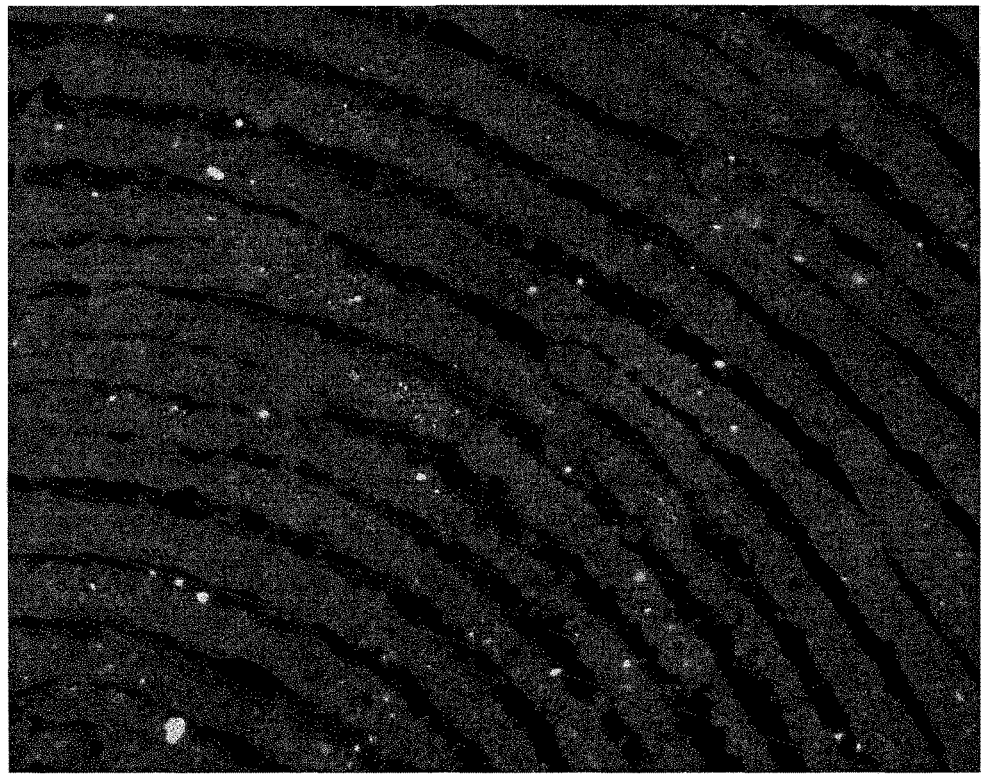
FIG. 9 is a photograph of a fingerprint obtained as a result of spraying a fingerprint detection liquid of Comparative Example 1 on a sample (made of acrylic) with a latent fingerprint and then washing the sample with water.
Figure 10:
FIG. 10 is a photograph of a fingerprint obtained as a result of spraying a fingerprint detection liquid of Comparative Example 1 on a sample (made of glass) with a latent fingerprint and then washing the sample with water.
Figure 11:
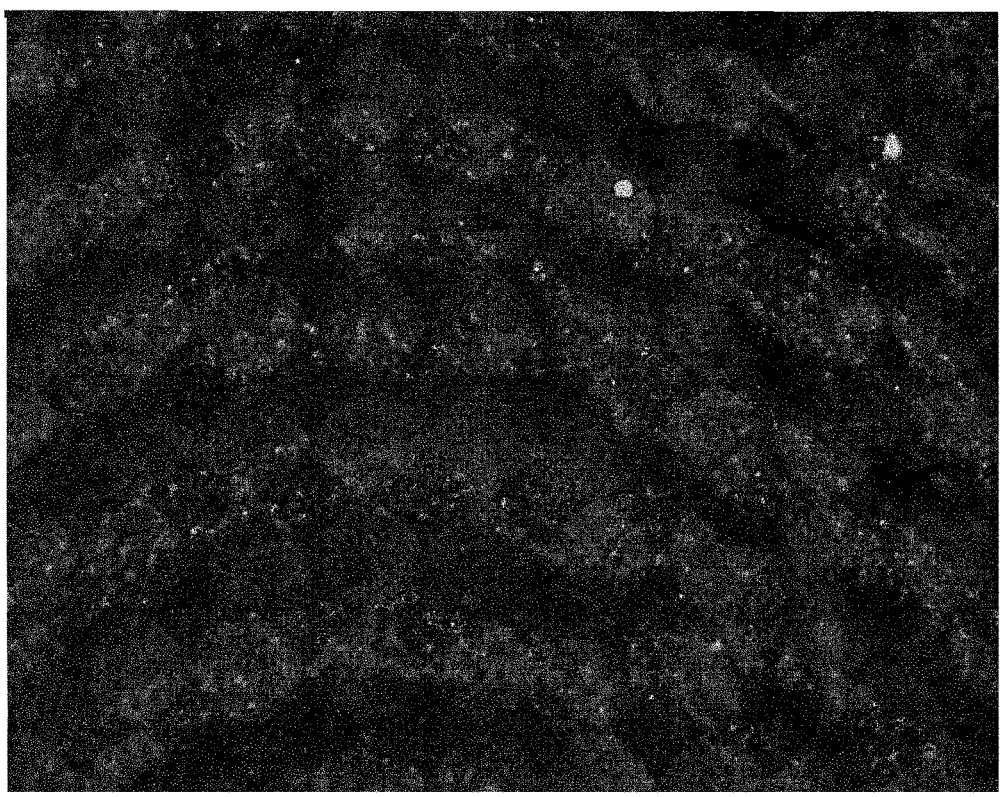
FIG. 11 is a photograph of a fingerprint obtained as a result of spraying a fingerprint detection liquid of Comparative Example 1 on a sample (made of a tile) with a latent fingerprint and then washing the sample with water.
Figure 12:
FIG. 12 is a photograph of a fingerprint obtained as a result of spraying a fingerprint detection liquid of Comparative Example 2 on a sample (made of acrylic) with a latent fingerprint and then washing the sample with water.
Figure 13:
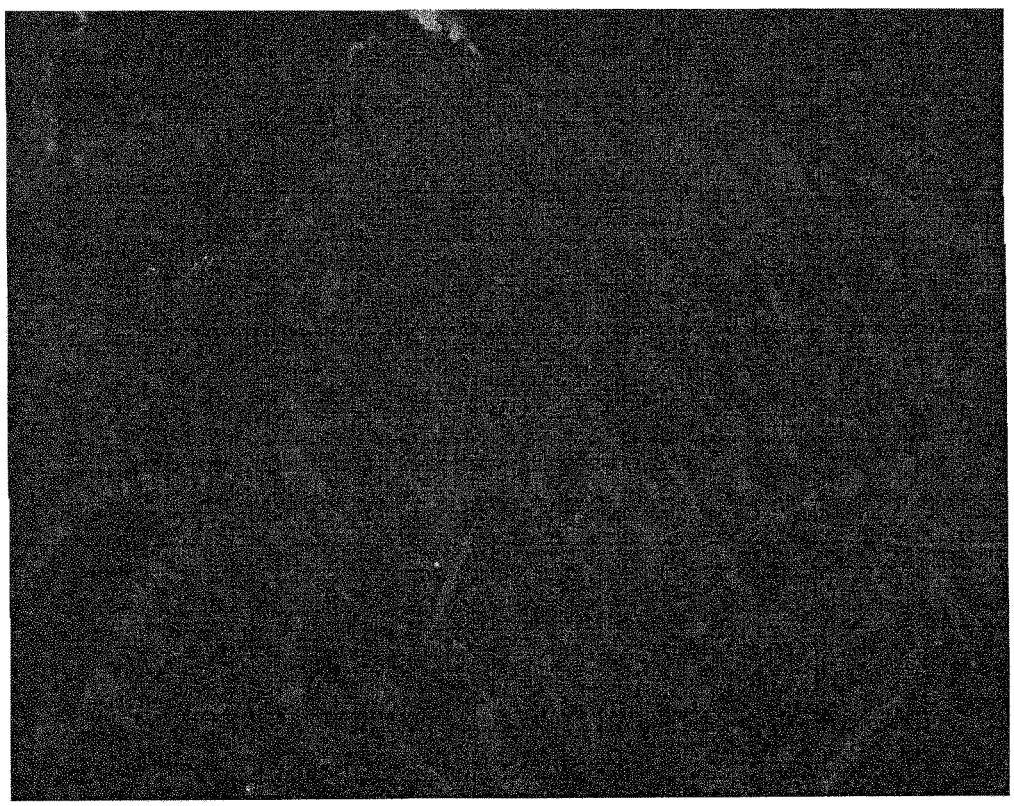
FIG. 13 is a photograph of a fingerprint obtained as a result of spraying a fingerprint detection liquid of Comparative Example 2 on a sample (made of glass) with a latent fingerprint and then washing the sample with water.
Figure 14:
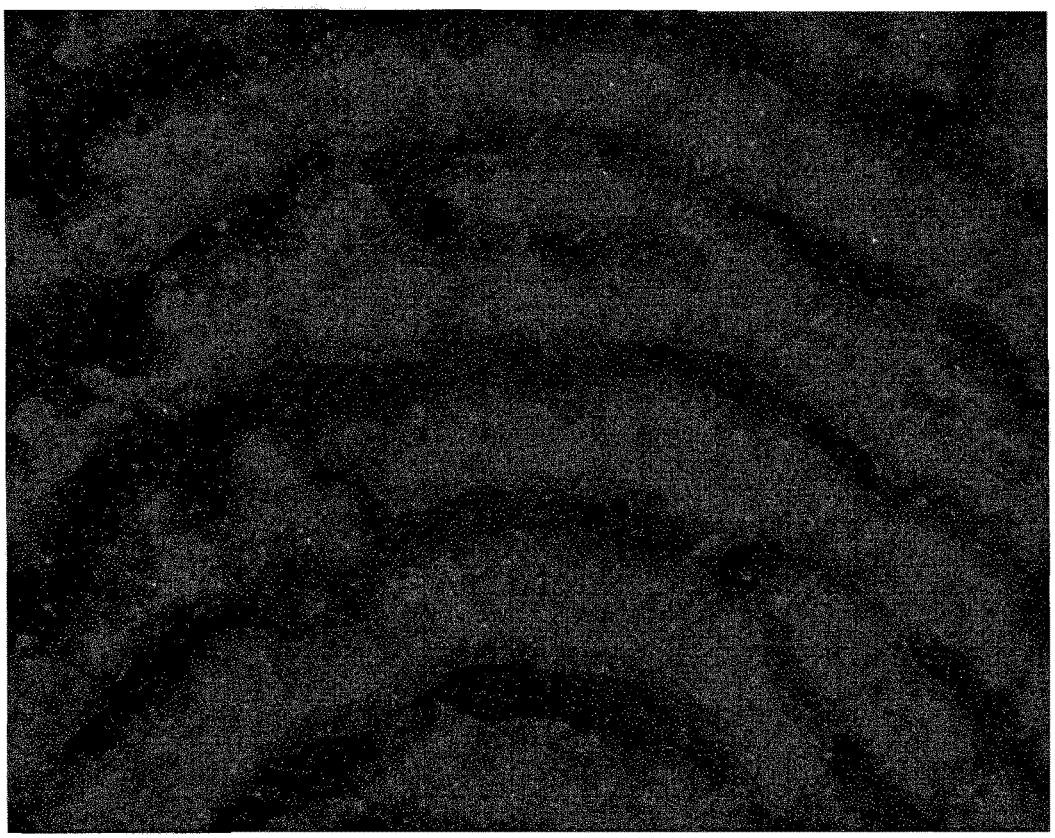
FIG. 14 is a photograph of a fingerprint obtained as a result of spraying a fingerprint detection liquid of Comparative Example 2 on a sample (made of a tile) with a latent fingerprint and then washing the sample with water.
Figure 15:
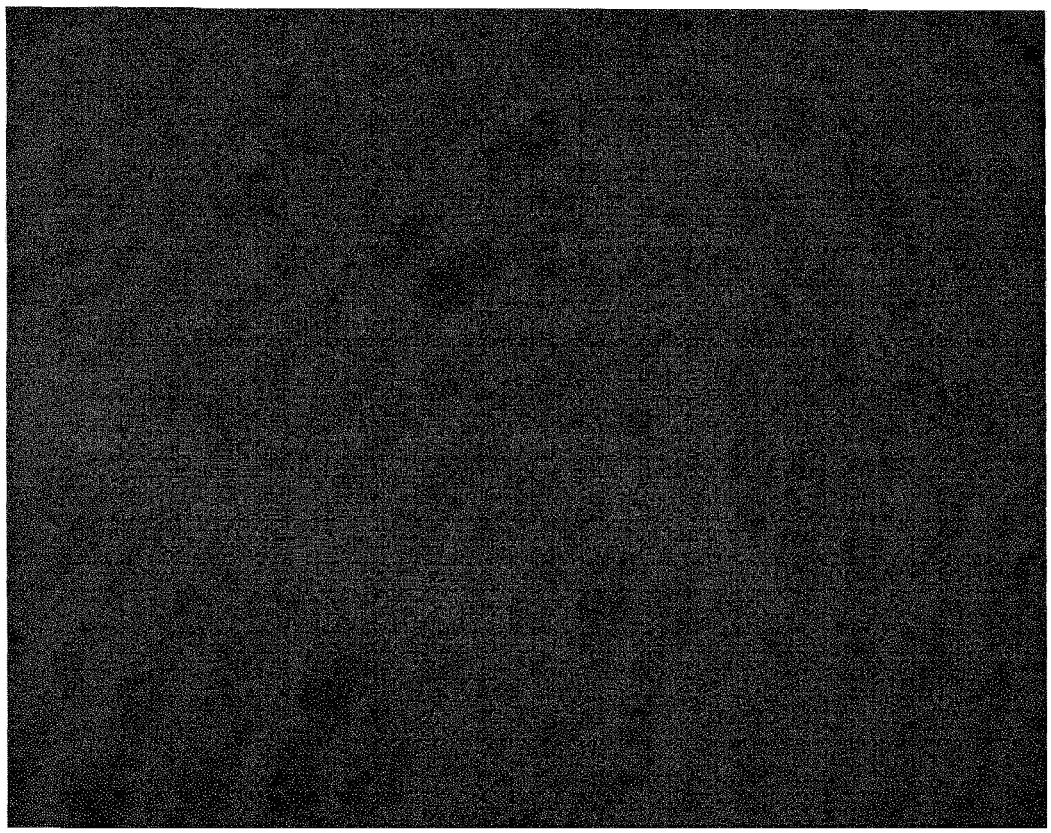
FIG. 15 is a photograph of a fingerprint obtained as a result of spraying a fingerprint detection liquid of Comparative Example 3 on a sample (made of acrylic) with a latent fingerprint and then washing the sample with water.
Figure 16:
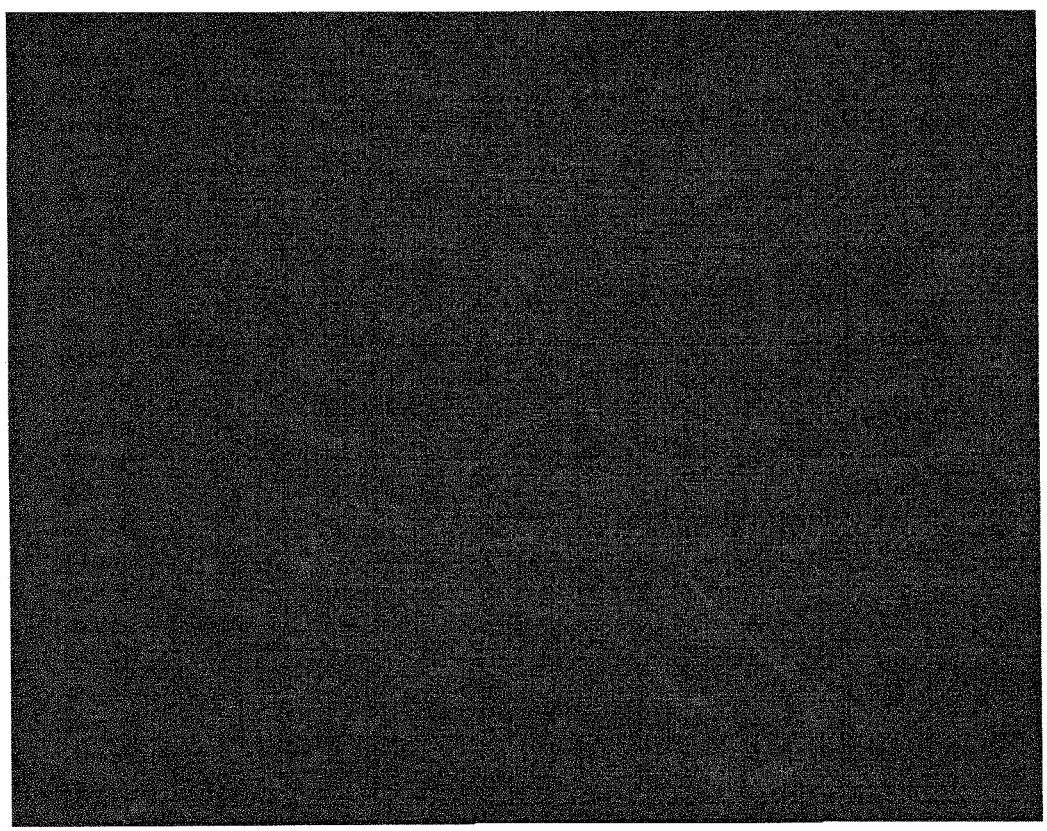
FIG. 16 is a photograph of a fingerprint obtained as a result of spraying a fingerprint detection liquid of Comparative Example 3 on a sample (made of glass) with a latent fingerprint and then washing the sample with water.
Figure 17:
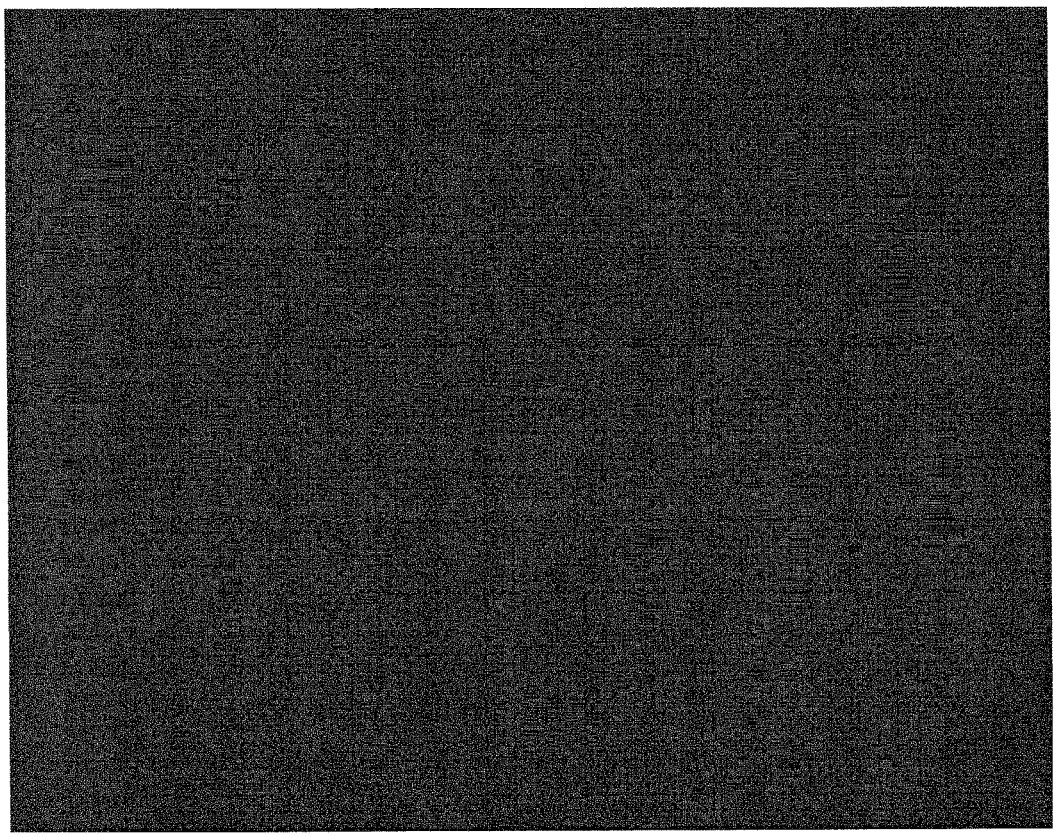
FIG. 17 is a photograph of a fingerprint obtained as a result of spraying a fingerprint detection liquid of Comparative Example 3 on a sample (made of a tile) with a latent fingerprint and then washing the sample with water.
Figure 18:
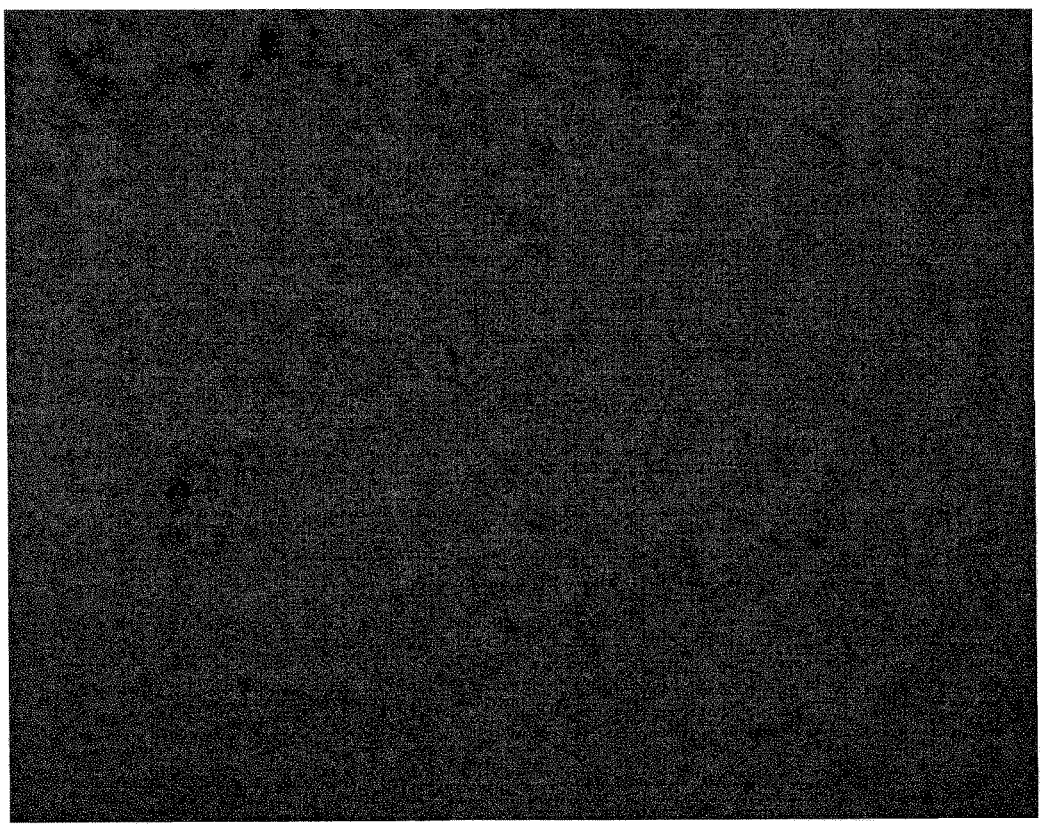
FIG. 18 is a photograph of a fingerprint obtained as a result of spraying a fingerprint detection liquid of Comparative Example 3 on a sample (made of a kraft tape with a non-sticky surface) with a latent fingerprint and then washing the sample with water.
Figure 19:
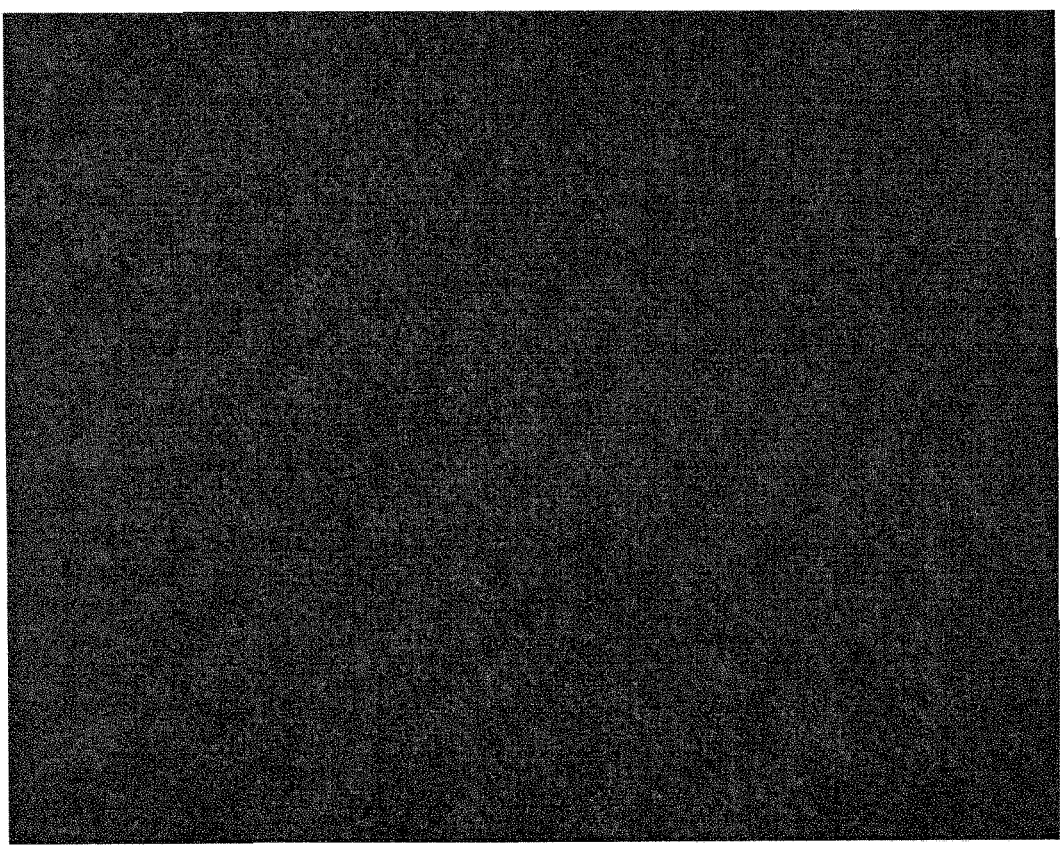
FIG. 19 is a photograph of a fingerprint obtained as a result of spraying a fingerprint detection liquid of Comparative Example 3 on a sample (made of a kraft tape with a sticky surface) with a latent fingerprint and then washing the sample with water.

On the other hand, FIG. 9 is a photograph of the fingerprint obtained as a result of spraying the fingerprint detection liquid of Comparative Example 1 on a sample (made of acrylic) with the latent fingerprint and then washing the sample with water. FIG. 10 is a photograph of the fingerprint obtained as a result of spraying the fingerprint detection liquid of Comparative Example 1 on a sample (made of glass) with the latent fingerprint and then washing the sample with water. FIG. 11 is a photograph of the fingerprint obtained as a result of spraying the fingerprint detection liquid of Comparative Example 1 on a sample (made of a tile) with the latent fingerprint and then washing the sample with water. FIG. 12 is a photograph of the fingerprint obtained as a result of spraying the fingerprint detection liquid of Comparative Example 2 on a sample (made of acrylic) with the latent fingerprint and then washing the sample with water. FIG. 13 is a photograph of the fingerprint obtained as a result of spraying the fingerprint detection liquid of Comparative Example 2 on a sample (made of glass) with the latent fingerprint and then washing the sample with water. FIG. 14 is a photograph of the fingerprint obtained as a result of spraying the fingerprint detection liquid of Comparative Example 2 on a sample (made of a tile) with the latent fingerprint and then washing the sample with water. FIG. 15 is a photograph of the fingerprint obtained as a result of spraying the fingerprint detection liquid of Comparative Example 3 on a sample (made of acrylic) with the latent fingerprint and then washing the sample with water. FIG. 16 is a photograph of the fingerprint obtained as a result of spraying the fingerprint detection liquid of Comparative Example 3 on a sample (made of glass) with the latent fingerprint and then washing the sample with water. FIG. 17 is a photograph of the fingerprint obtained as a result of spraying the fingerprint detection liquid of Comparative Example 3 on a sample (made of a tile) with the latent fingerprint and then washing the sample with water. FIG. 18 is a photograph of the fingerprint obtained as a result of spraying the fingerprint detection liquid of Comparative Example 3 on a sample (made of a kraft tape with a non-sticky surface) with the latent fingerprint and then washing the sample with water. FIG. 19 is a photograph of the fingerprint obtained as a result of spraying the fingerprint detection liquid of Comparative Example 3 on a sample (made of a kraft tape with a sticky surface) with the latent fingerprint and then washing the sample with water. FIGS. 9 to 19 show that the fingerprints obtained using the fingerprint detection liquids of Comparative Examples 1 to 3, respectively, have different levels of clarity depending on what the sample is made of The above description shows that even without adjustment of concentration and composition, the fingerprint detection liquid of Example 1 or 2 has produced better results than the fingerprint detection liquid of each comparative example with respect to the clarity of the detected fingerprint and the types of materials on which the fingerprint can be detected. Thus, it has been found that even without adjustment of concentration and composition, the fingerprint detection liquid according to the present invention produces better results than conventional fingerprint detection liquids with respect to the ability to recover clear fingerprints and the number of types of materials on which fingerprints can be detected.

What is claimed is:

1. A fingerprint detection liquid comprising:
   pigment particles;
   a silicone;
   a cationic surfactant; and
   an ionizing liquid that ionizes the cationic surfactant.

2. The fingerprint detection liquid according to claim 1, wherein the cationic surfactant comprises an ionic crystal having an ion represented by formula (1):

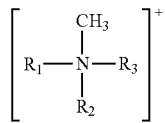

(1)

wherein $R_1$ and $R_2$ are each an alkyl group of 1 to 12 carbon atoms, and $R_3$ is a moiety comprising at least one selected from the group consisting of an aryl group and an alkyl group of 1 to 10 carbon atoms.

3. The fingerprint detection liquid according to claim 2, wherein the ionic crystal has the ion represented by formula (1) in which $R_3$ is an alkyl group of 1 to 10 carbon atoms.

4. The fingerprint detection liquid according to claim 2, wherein the ionic crystal having the ion represented by formula (1) is octyldimethylethylammonium ethylsulfate.

5. The fingerprint detection liquid according to claim 1, wherein the ionizing liquid comprises water.

6. The fingerprint detection liquid according to claim 1, wherein the silicone is a polyether-modified silicone represented by formula (2):

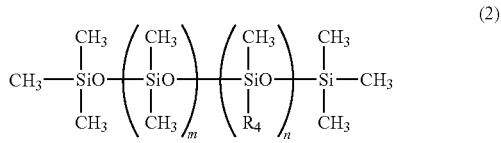

(2)

wherein $R_4$ is a polyoxyalkylene group represented by formula (3):

—$R_5$—O—$(C_2H_4O)_a(C_3H_6O)_bR_6$, wherein $R_5$ is an alkylene group of 2 to 30 carbon atoms, $R_6$ is a substituent represented by formula (4): —(OC)—$R_7$, wherein $R_7$ is an alkyl group of 1 to 30 carbon atoms, a satisfies $1 \leq a \leq 50$, b satisfies $1 \leq b \leq 50$, a and b satisfy $10 \leq a+b \leq 100$, and m and n satisfy $100 \leq m \leq 500$ and $1 \leq n \leq 40$, respectively.

7. The fingerprint detection liquid according to claim 1, wherein the pigment particles comprise at least one selected from the group consisting of titanium oxide, aluminum oxide, zinc oxide, zirconium oxide, red iron oxide, yellow oxide of iron, black oxide of iron, silica, carbon black, aluminum powder, and copper powder, or any composite thereof.

* * * * *